United States Patent
Chung

(10) Patent No.: US 8,249,564 B2
(45) Date of Patent: Aug. 21, 2012

(54) MOBILE DEVICE PROVIDING CANCELLATION OF CALL-WAITING AND METHOD THEREOF

(75) Inventor: Wen-Ching Chung, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 194 days.

(21) Appl. No.: 12/848,212

(22) Filed: Aug. 1, 2010

(65) Prior Publication Data

US 2011/0237228 A1 Sep. 29, 2011

(30) Foreign Application Priority Data

Mar. 29, 2010 (TW) ................ 99109375 A

(51) Int. Cl.
*H04M 3/42* (2006.01)
(52) U.S. Cl. ............ 455/414.1; 379/207.02; 379/93.35; 379/215.01
(58) Field of Classification Search ............... 455/414.1; 379/207.02, 93.35, 148.08, 215.01, 202.01
See application file for complete search history.

(56) References Cited

U.S. PATENT DOCUMENTS

2010/0159964 A1* 6/2010 Ferro ........................... 455/466
* cited by examiner

*Primary Examiner* — Rafael Pérez-Gutiérrez
*Assistant Examiner* — German Viana Di Prisco
(74) *Attorney, Agent, or Firm* — Altis Law Group, Inc.

(57) ABSTRACT

A mobile device includes a display module, an option module, a determination module, and a control module. The option module is operable to offer an answer option, a first rejection option, and a second rejection option to display on the display module. The determination module is operable to determine whether the answer option, the first rejection option, and the second rejection option are selected. The first rejection option is operable to operate a first incoming call during a current active call. If the first rejection option is selected, the control module rejects the first incoming call. If the second rejection option is selected, the control module rejects incoming calls after the first incoming call and ignores incoming call information indicating the incoming calls occurring after the first incoming call during the current active call.

12 Claims, 3 Drawing Sheets

MOBILE DEVICE PROVIDING CANCELLATION OF CALL-WAITING AND METHOD THEREOF

BACKGROUND

1. Technical Field

The present disclosure relates to a mobile device providing cancellation of call-waiting and a method thereof.

2. Description of Related Art

Mobile devices such as mobile phones often provide a call-waiting function. An incoming call can be rejected if interruption of a current call is undesirable. However, subsequent incoming calls will generate respective notifications, which, in addition to repeatedly disturbing the current call, must be individually rejected.

DETAILED DESCRIPTION

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
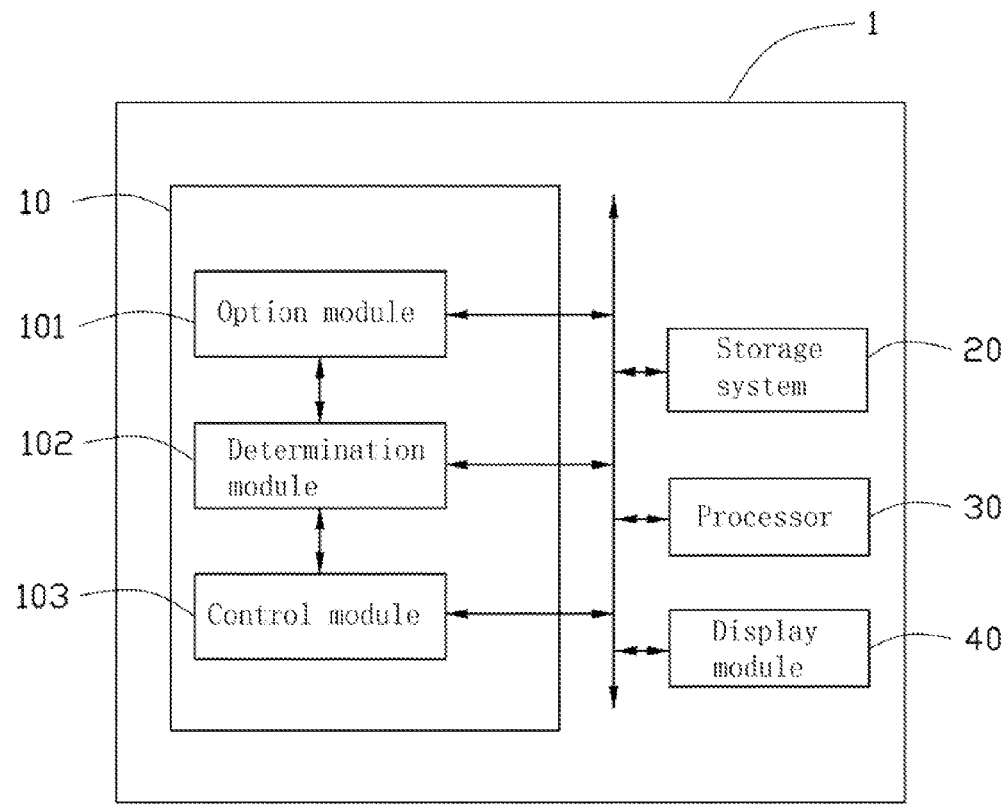
FIG. 1 is a block diagram of one embodiment of a mobile device.

FIG. 1 is a block diagram of one embodiment of a mobile device 1. The mobile device 1 includes a system 10, a storage system 20, a processor 30, and a display module 40. The system 10 includes an option module 101, a determination module 102, and a control module 103. The option module 101 and the control module 103 may comprise one or more computerized instructions/programs that are stored in the storage system 20 and are executed by the processor 30. The display module 40 may be a LCD screen or a touch screen, for example. In the embodiment, the display module 40 is the touch screen.

The mobile device 1 is generally controlled and coordinated by an operating system, such as UNIX, Linux, Windows, Mac OS, an embedded operating system, or any other compatible system. Alternatively, the mobile device 1 may be controlled by a proprietary operating system. Typical operating systems control and schedule computer processes for execution, perform memory management, provide file system, networking, and I/O services, and provide a user interface, such as a graphical user interface (GUI), among other tasks.

The option module 101 is operable to offer an answer option, a first rejection option, and a second rejection option to display on the display module 40. The answer option is an option to answer an incoming call. The first rejection option is an option to reject a first incoming call received during a current active call. The second option is an option to reject incoming calls after the first incoming call during the current active call. The display module 40 displays the options so that a user may select the options on the display module 40 to operate the incoming calls.

The determination module 102 is operable to determine whether the answer option, the first rejection option, and the second rejection option are selected to display on the display module 40. The control module 103 is operable to answer the first incoming call and the incoming calls after the first incoming call during the current active call when the answer option is selected, reject the first incoming call during the current active call when the first rejection option is selected, and refuse the incoming calls after the first incoming call during the current active call when the second rejection option is operated.

The option module 101 is further operable to ignore incoming call information indicating the incoming calls after the first incoming call when the second rejection option is selected and offer the incoming call information indicating the incoming calls after the first incoming call when the current active call is finished. The incoming call information may include a phone number and a corresponding incoming call time.

Figure 2:
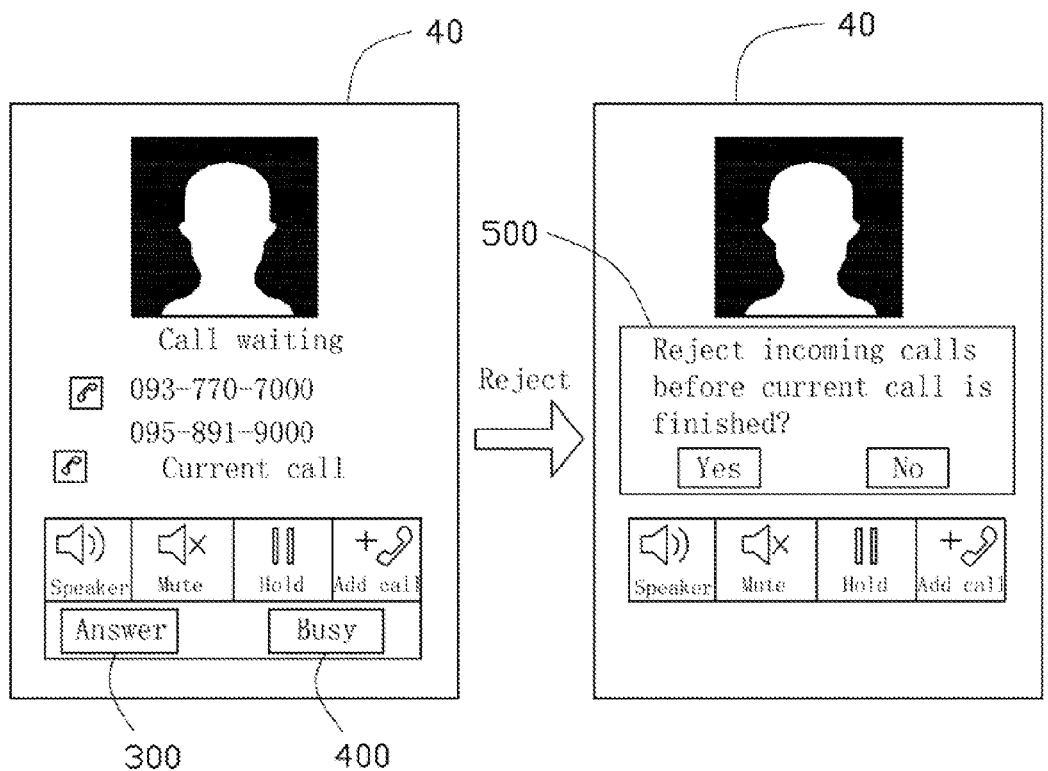
FIG. 2 shows an exemplary embodiment of cancelling a call-waiting function during a current active call.

FIG. 2 shows an exemplary embodiment of cancelling the call-waiting function during the current active call. The display module 40 displays a virtual key "Answer" 300, a virtual key "Busy" 400, and a dialogue 500. The virtual key "Answer" 300 represents the answer option. The virtual key "Busy" 400 represents the first rejection option. The dialogue window 500 is operable to determine if the incoming calls are to be rejected before the current active call is finished. Option "Yes" of the dialogue window 500 represents the second rejection option. A call "095-891-9000" represents the current active call, and a call "093-770-7000" represents the first incoming call received during the current active call. If the virtual key "Answer" 300 is selected, the call "093-770-7000" is answered. If the virtual key "Busy" 400 is selected, the dialogue window 500 is displayed. If the option "Yes" of the dialogue window 500 is selected, the call "093-770-7000" and all subsequent incoming calls are rejected while the call "095-891-9000" is in progress. Alternatively, if option "No" of the dialogue window 500 is selected, only the call "093-770-7000" is rejected while the call "095-891-9000" is in progress.

Figure 3:
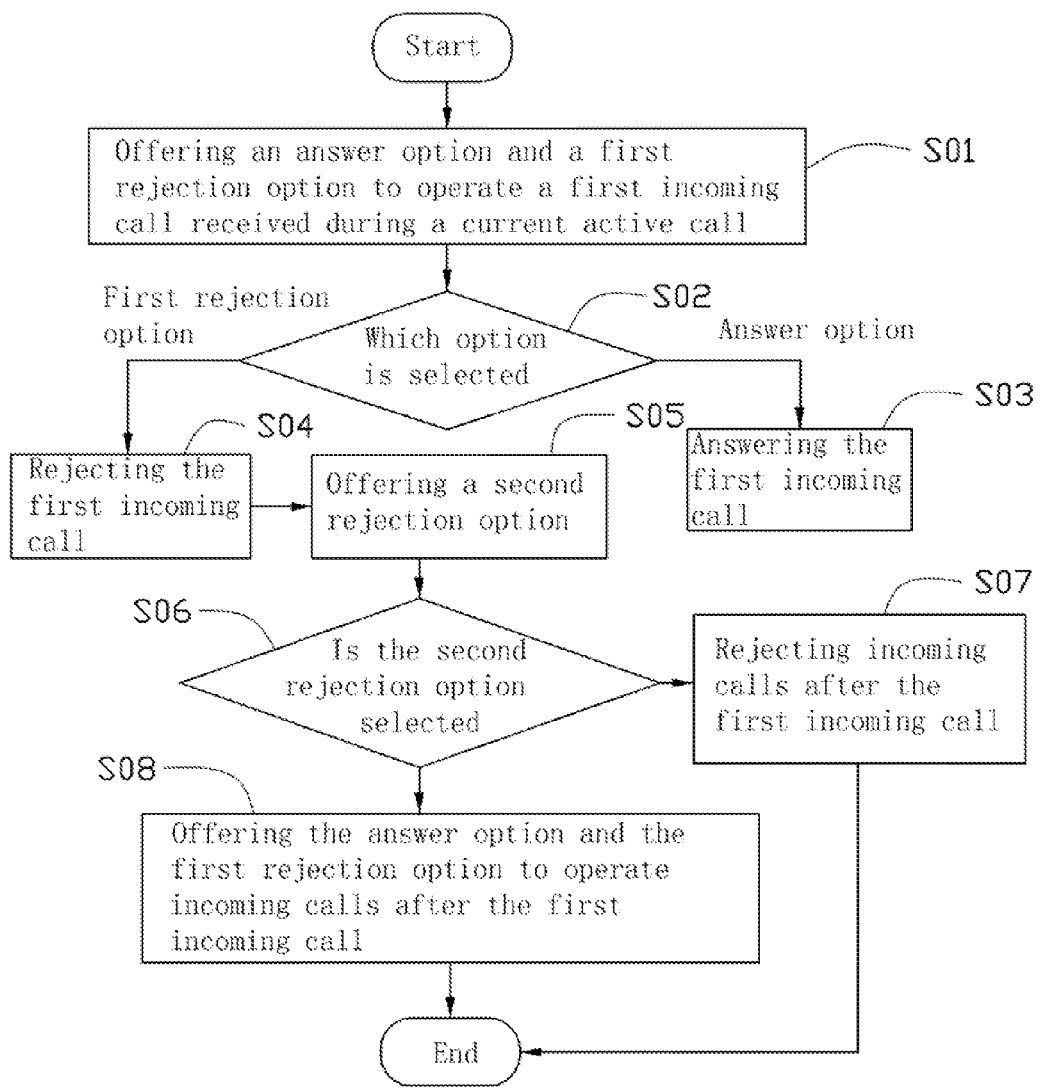
FIG. 3 is a flowchart illustrating one embodiment of a method for cancelling a call-waiting function during a current active call.

FIG. 3 is a flowchart illustrating one embodiment of a method for cancelling the call-waiting function during the current active call. Depending on the embodiment, additional blocks in the flow of FIG. 3 may be added, others removed, and the ordering of the blocks may be changed.

In block S01, the option module 101 offers the answer option and the first rejection option for the first incoming call to display on the display module 40 during the current active call.

In block S02, the determination module 102 determines which option is selected on the display module 40.

In block S03, if the answer option is selected on the display module 40, the control module 103 answers the first incoming call during the current active call.

In block S04, if the first rejection option is selected on the display module 40, the control module 103 rejects the first incoming call.

In block S05, the option module 101 then offers the second rejection option to display on the display module 40.

In block S06, the determination module 102 determines whether the second rejection option is selected on the display module 40.

In block S07, if the second rejection option is selected on the display module 40, the control module 103 rejects the incoming calls after the first incoming call during the current active call. The option module 101 further ignores the incoming call information indicating the incoming calls occurring after the first incoming call during the current active call and offers the incoming call information indicating the incoming calls occurring after the first incoming call to display on the display module 40 when the current active call is finished.

In block S08, if the second rejection option is not selected on the display module 40, the option module 101 offers the answer option and the first rejection option for the incoming calls occurring after the first incoming call to display on the display module 40 during the current active call.

The present disclosure provides a mobile device able to cancel a call-waiting function during a current active call, and a method thereof. The disturbance brought by the call-waiting function is avoided.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for cancelling a call-waiting function during a current active call of a mobile device, the mobile device comprising a display module, the method comprising:
    offering an answer option and a first rejection option to display on the display module to operate a first incoming call which is waiting during the current active call;
    determining which option is selected;
        when the first rejection option is selected:
            rejecting the first incoming call; and
            offering a second rejection option to display on the display module;
                determining whether the second rejection option is selected;
                when the second rejection option is selected:
                    rejecting incoming calls after the first incoming call;
                    ignoring incoming call information indicating the incoming calls after the first incoming call; and
                    offering the incoming call information indicating the incoming calls after the first incoming call to display on the display module when the current active call is finished; and
                when the second rejection option is not selected:
                    offering the answer option and the first rejection option to display on the display module to operate incoming calls after the first incoming call during the current active call.

2. The method of claim 1, further comprising:
    answering the first incoming call if the answer option is selected.

3. The method of claim 1, further comprising: offering the incoming call information indicating the incoming calls after the first incoming call to display on the display module when the current active call is finished.

4. The method of claim 3, wherein the incoming call information comprises a phone number and a corresponding incoming call time.

5. A mobile device comprising:
    a storage system;
    at least one processor;
    one or more programs stored in the storage system and being executable by the at least one processor;
    a display module;
    an option module operable to offer an answer option, a first rejection option, and a second rejection option to display on the display module to operate a first incoming call which is waiting during the current active call;
    a determination module operable to determine whether the answer option, the first rejection option, and the second rejection option are selected;
    and a control module operable to:
    reject the first incoming call and offer a second rejection option to display on the display module when the first rejection option is selected;
    reject incoming calls after the first incoming call, ignore incoming call information indicating the incoming calls after the first incoming call, and offer the incoming call information indicating the incoming calls after the first incoming call to display on the display module when the current active call is finished when the second rejection option is selected; and
    offer the answer option and the first rejection option to display on the display module to operate incoming calls after the first incoming call during the current active call when the second rejection option is not selected.

6. The mobile device of claim 5, wherein the control module is further operable to answer the first incoming call and the incoming calls after the first incoming call during the current active call when the answer option is selected.

7. The mobile device of claim 5, wherein the option module is further operable to offer the incoming call information indicating the incoming calls after the first incoming call to display on the display module when the current active call is finished.

8. The mobile device of claim 7, wherein the incoming call information comprises a phone number and a corresponding incoming call time.

9. A non-transitory storage medium having stored thereon instructions that, when executed by a processor, causing the processor to perform a method for cancelling a call-waiting function during a current active call of a mobile device, the mobile device comprises a display module, wherein the method comprises:
    offer an answer option and a first rejection option to display on the display module to operate a first incoming call which is waiting during the current active call;
    determine which option is selected;
        when the first rejection option is selected:
            reject the first incoming call; and
            offer a second rejection option to display on the display module;
                determine whether the second rejection option is selected;
                when the second rejection option is selected:
                    reject incoming calls after the first incoming call;
                    ignore incoming call information indicating the incoming calls after the first incoming call; and offer the incoming call information indicating the incoming calls after the first incoming call to display on the display module when the current active call is finished; and when the second rejection option is not selected:

offer the answer option and the first rejection option to display on the display module to operate incoming calls after the first incoming call during the current active call.

10. The storage medium of claim 9, wherein the method further comprises:

answer the first incoming call if the answer option is selected.

11. The storage medium of claim 10, wherein the method further comprises: offer the incoming call information indicating the incoming calls after the first incoming call to display on the display module when the current active call is finished.

12. The storage medium of claim 11, wherein the incoming call information comprises a phone number and a corresponding incoming call time.

* * * * *